United States Patent [19]
Coleman

[11] Patent Number: 5,654,534
[45] Date of Patent: Aug. 5, 1997

[54] HAND HELD OR HAND MOUNTED BAR CODE SCANNING DEVICE HAVING A DISPLAY WHICH PIVOTS BETWEEN AN OPEN AND CLOSED POSITION

[75] Inventor: Edward P. Coleman, Monroe County, N.Y.

[73] Assignee: PSC, Inc., Webster, N.Y.

[21] Appl. No.: 407,172

[22] Filed: Mar. 21, 1995

Related U.S. Application Data

[63] Continuation of Ser. No. 204,925, Mar. 2, 1994, abandoned.

[51] Int. Cl.⁶ .................................................. G06K 7/10
[52] U.S. Cl. ................................... 235/472; 235/462
[58] Field of Search .......................... 235/472, 455, 235/462; 364/708.01

[56] References Cited

U.S. PATENT DOCUMENTS 5,107,100  4/1992  Shepard ............................. 235/472

FOREIGN PATENT DOCUMENTS 2242162  9/1991  United Kingdom ............. 235/375

*Primary Examiner*—Donald T. Hajec
*Assistant Examiner*—Karl D. Frech
*Attorney, Agent, or Firm*—Joseph F. Murphy

[57] ABSTRACT

A bar code hand held scanning terminal which combines a data input device, a display and a scanning engine in a single portable unit. This unit is compact and may be employed in, for example, a scanning terminal which is attached to the back of a hand of an operator. Alternatively, the unit may be employed in a gun-type hand held scanning terminal. The combination has a display which is pivotally connected to the hand held scanning terminal such that the display may be in an open position or in a closed position. A light sensor is used to detect the opening or closing of the display portion of the hand held scanning terminal and maybe used to selectively deactivate the scanning beam when the display is open. The scanning device may be used to read bar code labels for inventory or warehousing, in medical prescription distribution, etc.

15 Claims, 9 Drawing Sheets

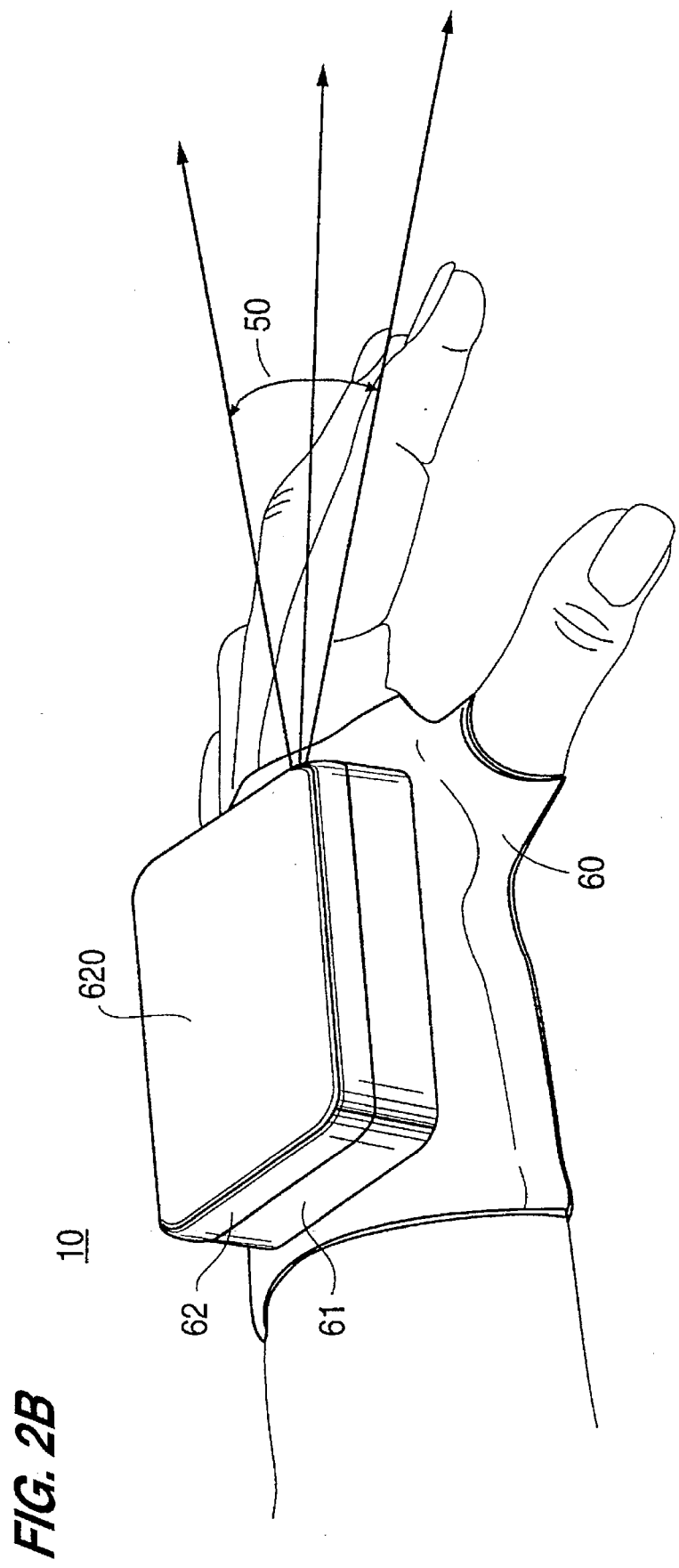

HAND HELD OR HAND MOUNTED BAR CODE SCANNING DEVICE HAVING A DISPLAY WHICH PIVOTS BETWEEN AN OPEN AND CLOSED POSITION

This application is a continuation of application Ser. No. 08/204,925, filed 2 Mar. 1994, now abandoned.

BACKGROUND OF THE INVENTION

The present invention relates to hand held or hand mounted bar code scanners which provide for the entry of data by optical code reading or by keyboard entry and, more particularly, to a laser scanning terminal which combines a terminal for data entry and system configuration, a display, and a scan engine all in one unit. The single unit defines a hand held or hand mounted scanning terminal which will be collectively referred to hereinafter as a hand held scanning terminal.

The instant invention is especially suitable for providing a hand held data terminal which is battery operated and which may be used to gather data by manual entry of data and/or by operation of an optical reader of codes representing the data. All of these functions may be combined into a single scanning unit.

Typically, in portable scanners a light source such as a laser generates a scanning beam which is directed along a scanning path toward a bar code symbol for reflection from the symbol. A photodetector detects light of variable intensity reflected off of the symbol and generates electrical signals indicative of the detected light. These electrical signals are decoded into data for identifying the symbol.

The detailed design of bar code reading instruments, including the scanning circuitry, are described in U.S. Pat. No. 5,258,604, which was issued to James Behrens et al. on Nov. 2, 1993 and is entitled "Bar Code Scanner"; U.S. Pat. No. 5,237,161, which was issued to Scott R. Grodevant on Aug. 17, 1993 and is entitled "System for Automatically Reading Symbols, Such as Bar Codes, on Objects Which are Placed in the Detection Zone of a Symbol Reading Unit, Such as a Bar Code Scanner"; U.S. Pat. No. 5,212,371, which was issued to John A. Boles et al. on May 18, 1993 and is entitled "Hand Held Bar Code Scanner with Improved Aiming Means"; and U.S. Pat. No. 5,200,597, which was issued to Jay M. Eastman et al. on Apr. 6, 1993 and is entitled "Digitally Controlled System for Scanning and Reading Bar Codes." The entire contents of all four of these patents are incorporated herein by reference. A back of the hand type bar code scanning device is also shown and described in U.S. patent application Ser. No. 08/056,887, filed Apr. 2, 1993 by Chay La entitled "Non-Contact Actuated Trigger Apparatus for Bar Code Laser Scanner" which is also herein incorporated by reference. All four of these patents and the identified patent application are owned by PSC, Inc. (Webster, N.Y.) assignee of the present invention.

U.S. Pat. No. 5,250,790, which was issued to Boris Melitsky et al. on Oct. 5, 1993, entitled "Hand-Mounted Scanner with Automatic Manual Initiation of Reading Indicia," and U.S. Pat. No. 5,250,792, which was issued to Jerome Swartz et al. on Oct. 5, 1993, entitled "Portable Laser Diode Scanning Head," both assigned to Symbol Technologies, Inc. (Bohemia, N.Y.), disclose other conventional scanners.

Conventional prior art hand held scanning devices, particularly when mounted on the back of a hand or wrist, confront many difficult problems and disadvantages. The scanning devices must be made small in size to accommodate portable use. Further, when mounted on the back of a hand, it is necessary that the devices be of light-weight construction. To fulfil these requirements, many light weight portable units do not have display and keyboard functions. The usefulness of such devices is significantly limited since they cannot be easily reconfigured without attaching the portable scanner to some other device which includes input and display means. Further, without input keys, codes which cannot be optically read due to a label defect cannot be manually entered. One solution to this problem is to attach the device to other hardware. However, this additional hardware is typically quite bulky and defeats the primary purpose of a portable device.

Still other attempts have been made to incorporate a display and keyboard onto the device itself. FIG. 1A shows one such device where a scanner is mounted on a wrist. In FIG. 1A, a scanning beam 1 is generated by a scan engine located within the scanner 2. A small display 3 and input device 4 is incorporated into the scanner 2. The scanner of FIG. 1A is more particularly disclosed in U.S. Pat. No. 5,191,187. Numerous drawbacks are inherent in such a device. One such drawback is that the display and keyboard are necessarily small in order to be accommodated on the device shown. In other words, the volume available to accommodate the display and the keyboard is very limited. This makes it difficult for the operator to utilize the keys and limits the amount and size of data which can be displayed on the display. An additional drawback is that the input device is open to accidental actuation of the input keys as the arm of the operator is moved in the use of the device. Still another drawback of the device depicted in FIG. 1A is that the display is hard to see. The viewing angle for reading an LCD display is particularly critical. In order to achieve a desirable viewing angle in the device illustrated in FIG. 1A, the arm must be significantly rotated. As a result it is difficult to use the device's display while aiming the scanner.

Alternatively, the display 3 and input device 4 have been placed on the arm 5 of the operator as depicted in FIG. 1B. In FIG. 1B similar elements are referenced with like reference numerals. A cable 6 connects the scanner 2 to the display 3 and input device 4. This device is quite bulky and cumbersome to use. Further, the arm must be significantly rotated in order to operate the input device 4 and to achieve the optimum viewing angle for the LCD display 3.

SUMMARY OF THE INVENTION

An object of the instant invention is to provide a light weight portable hand held scanning terminal which overcomes the above described drawbacks of conventional portable scanning terminals. The hand held scanning terminal according to the instant invention has a pivotable display which pivots between an open and closed position. The display includes a soft menu which allow a user to configure the hand held scanning terminal when the display is in its open position. The device further includes an optical sensor to indicate, among other functions, whether the display is in it open or closed position. Such a device is especially useful for inventory, warehousing, medical prescription distribution in hospitals, etc. The compact, lightweight nature of the disclosed scanning terminals in combination with ease of configuring the system for different uses as well as the ability to manually input information to the device, allows the hand held scanning terminal to be used in a large variety of applications.

In order to achieve the above and other objects of the instant invention there is provided a scanning device for reading a data pattern, which includes: a housing or base having a scanning engine disposed therein for projecting a scanning light beam through one side of the housing, which defines a scan beam side, toward a data pattern in order to detect different light intensities reflected by the pattern and to identify the pattern on the basis of the light intensities; a cover movably connected to the housing has an open and a closed position, the closed position covering a portion of the housing; and input keys located on the portion of the housing covered by the cover when it is in its closed position. The device may further include a display incorporated into either the cover or the housing. In another embodiment there is also provided a light sensor located on either the housing or the cover to detect ambient light and output a position signal indicating whether the display is in its open or closed position. The position signal may also be used to control an on/off state of the scanning engine. The display may include a soft menu controlled by the operation of input function keys corresponding to the soft menu to select the operating configuration of the device.

BRIEF DESCRIPTION OF THE DRAWINGS

The invention will best be understood from the following description of specific embodiments when read in connection with the accompanying drawings in which:

FIG. 2B illustrates a different operational view of the scanning device depicted in FIG. 2A;

DETAILED DESCRIPTION OF THE PREFERRED EMBODIMENTS

Figure 1A:
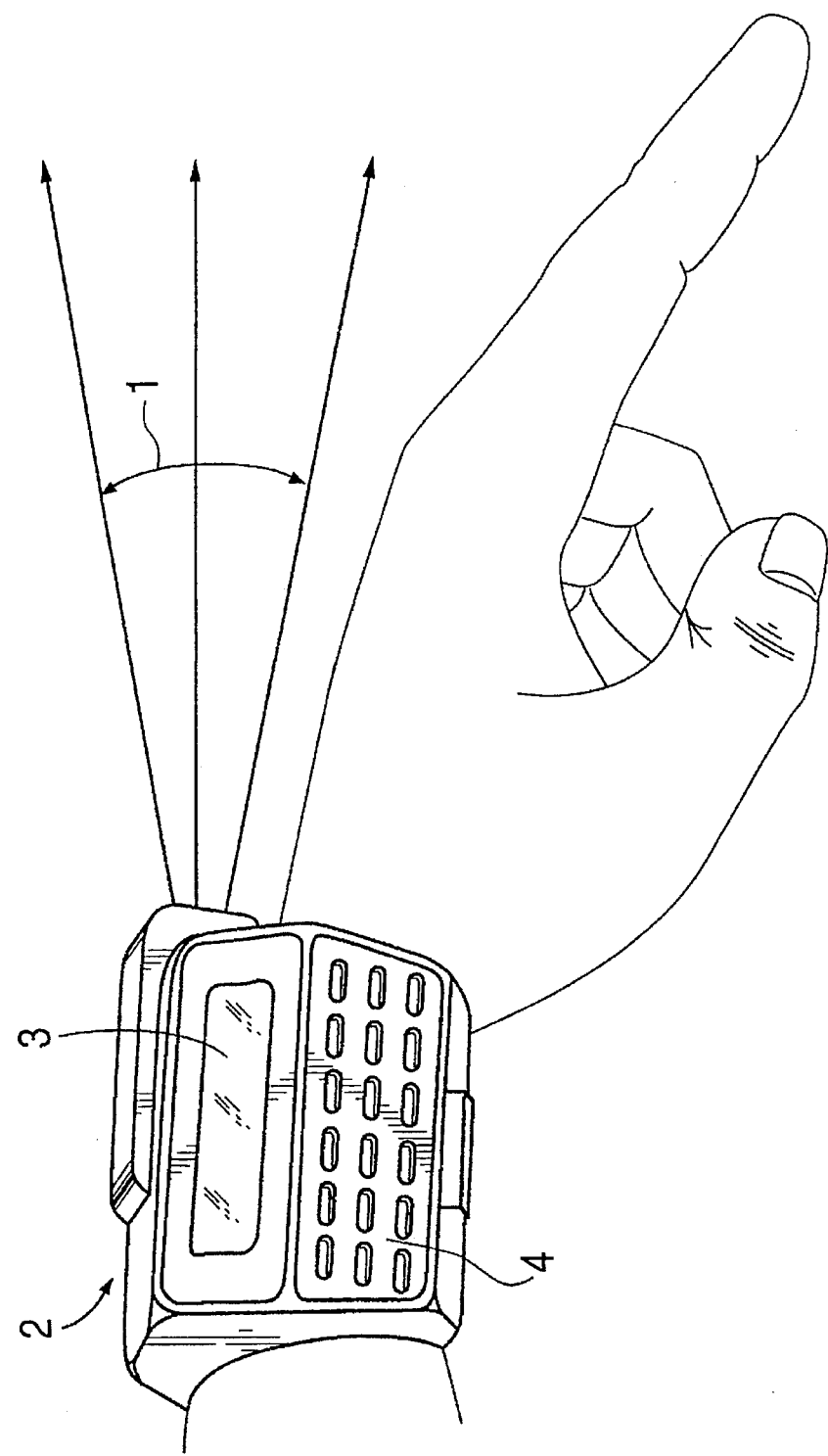
FIGS. 1A and 1B depict conventional portable scanning devices.
Figure 1B:
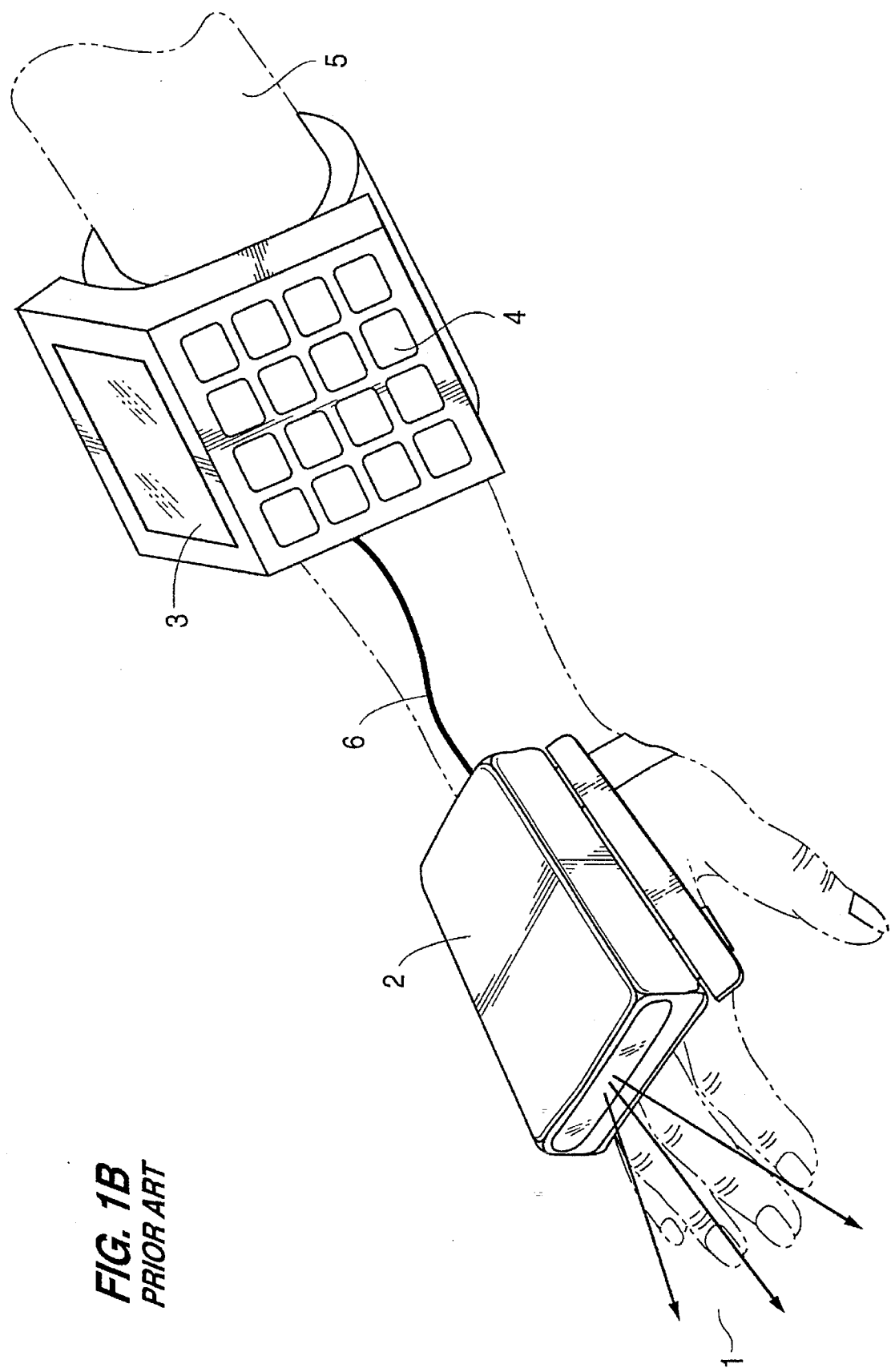
Figure 2A:
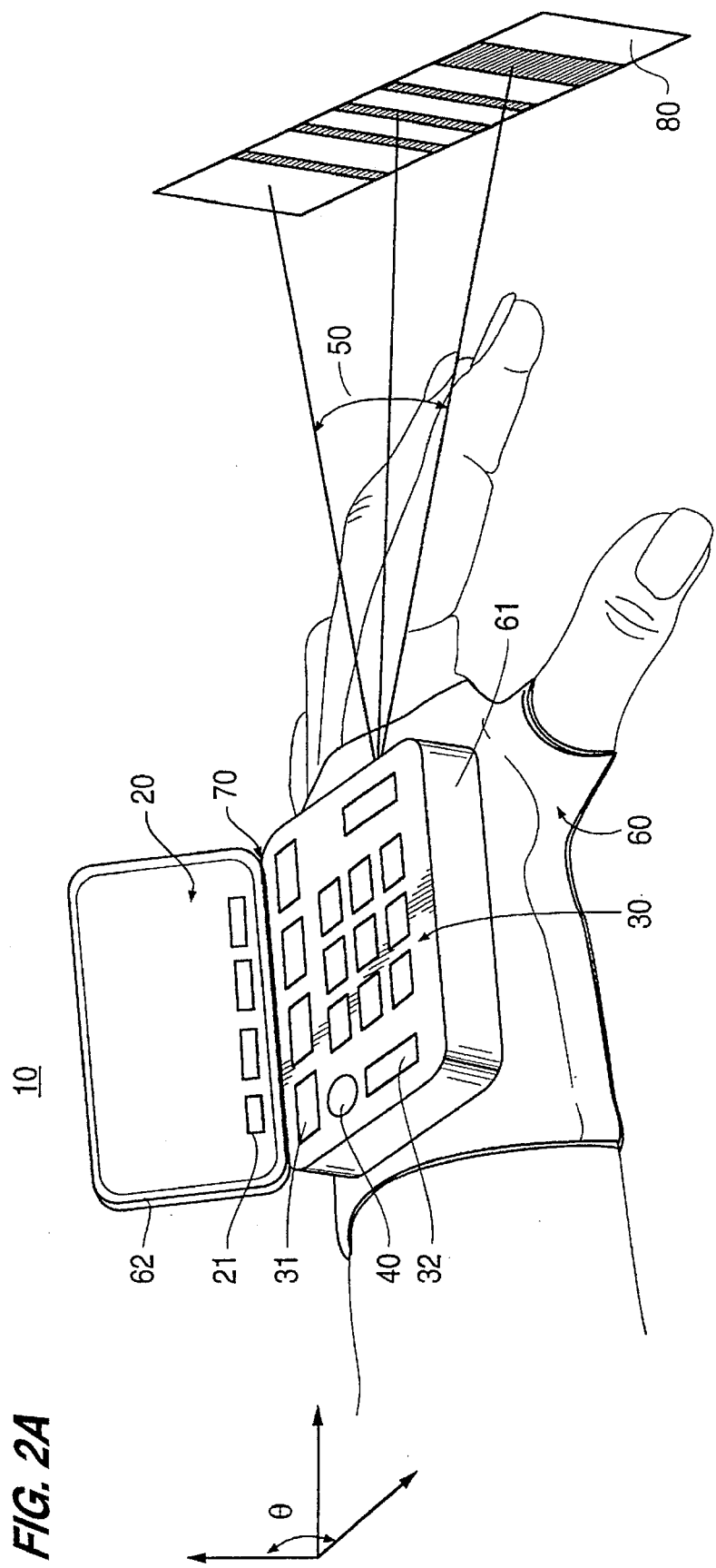
FIG. 2A illustrates a scanning device according to an embodiment of the instant invention.

FIG. 2A depicts a portable hand held scanning terminal which is adapted to be attached to the back of a hand according to a first embodiment of the instant invention. A hand held scanning terminal 10 is generally shown. Hand held scanning terminal 10 is attached to a glove 60 which is worn on the hand of an operator. Hand held scanning terminal 10 has a bottom portion 61 and a top portion 62. Scanning beam 50 is used to scan data in the form of optical indicia such as a bar code label 80. As is described in the above patents, a scanning engine which includes pattern detection electronics (not shown) within the bottom portion 61 detects and interprets intensity variations from the bar code 80 in order to read the information contained in the bar code 80. The top portion 62 is attached to the bottom portion 61 via a pivotal mount such as a hinge 70. The hinge 70 operates as a mechanical connection to hold the top portion 62 in place and provides the necessary electrical connections between the top portion 62 and the bottom portion 61 via conventional thin multi-wire connectors. When the top portion 62 is in its open position, it defines an angle θ between a plane representing the bottom portion 61 and a plane representing the top portion 62 along a horizontal axis extending along hinge 70. Angle θ is shown in FIG. 2A. The angle θ defines the viewing position for display 20. One or more angles θ may be predetermined as the viewing (or open) position(s) for the top portion 62. The determination is made based on the desired viewing configuration and use of the hand held scanning terminal 10. It is also possible to select hinge 70 such that display 20 will rest firmly at an angle θ. The angle θ is in a range of from 70° to 110°.

In one embodiment, the bottom portion 61 and the top portion 62 may be removably attached via hinge 70. In such an embodiment, easily connectable and disconnectable electrical contact terminals are used for the electrical connections and a snap engagement hinge is used for the mechanical connection. The top portion 62 includes an LCD display 20 for displaying, inter alia, information about the configuration and operation of the hand held scanning terminal 10. The LCD display 20 includes a soft menu 21 which allows the user to select various options or operating functions of the hand held scanning terminal.

The bottom portion 61 also includes a data input keyboard 30. The data input keyboard 30 includes alpha numeric keys 32 for entering data as well as function keys 31 for operation in connection with the soft menu 21. Also located on the data entry keyboard 30, within the bottom portion 61, is a light sensor 40. Sensor 40 may include, for example, a PN photodiode or a photoresistor. One function of sensor 40 is to inform the hand held scanning terminal electronics whether the top portion 62 is in its open or closed position as further described below.

As shown in FIGS. 2A and 2B top portion 62 has an open position (FIG. 2A) and a closed position (FIG. 2B). The top portion 62 includes a lid 620. In the closed position shown in FIG. 2B, the lid 620 provides protection for the data input keyboard 30 of the hand held scanning terminal from dust and other hazards. The lid 620 also shields the input keys from accidental actuation.

Sensor 40 senses ambient light. The output from sensor 40 may be used to indicate when the hand held scanning terminal is in the open position. When the top portion 62 of the hand held scanning terminal 10 is in the closed position, power to the LCD terminal may be removed in order to automatically save power. This is particularly important in battery powered devices in order to prolong the life of the device between battery replacement or charging. The importance of reducing power consumption is discussed in detail in U.S. Pat. No. 5,019,698 issued to Jay M. Eastman on May 14, 1991 and entitled "Bar Code Reading System Having Electrical Power Conservation and Laser Radiation Power Limiting Means", also assigned to the assignee of the instant application and also herein incorporated by reference.

Sensor 40 may selectively be used to disable the scanning beam when the top portion 62 of the hand held scanning terminal 10 is in the open position. Alternatively, the scanning beam may be employed regardless of whether the top portion 62 of the hand held scanning terminal 10 is in the open position. Selection of the particular operating mode of the sensor may be accomplished under control of the function keys 31 and soft menu selection 21.

Figure 3:
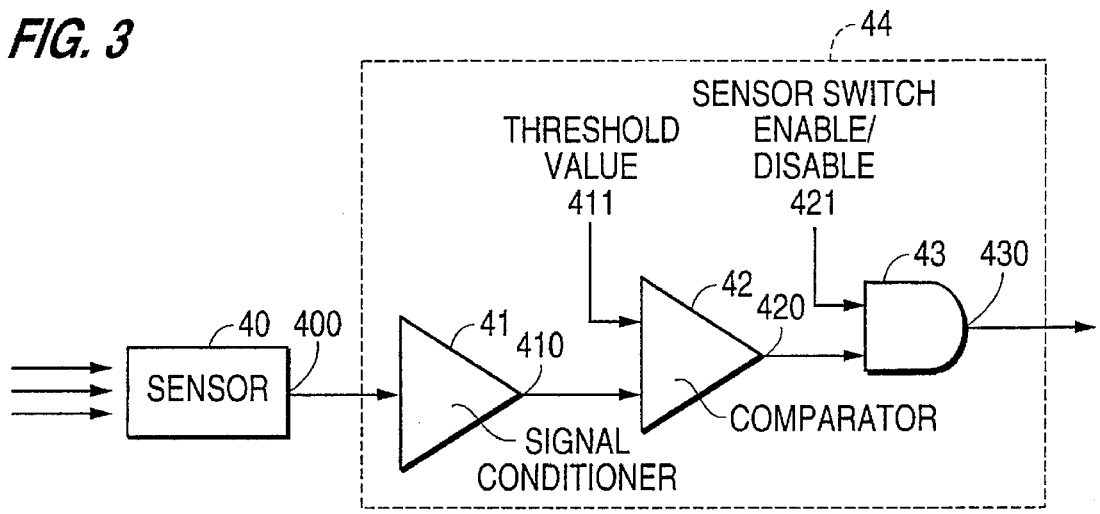
FIG. 3 illustrates a simple circuit for the operation of an optical sensor according to an embodiment of the instant invention.

FIG. 3 illustrates a diagram of a simple circuit which illustrates the principles used to accomplish the selective feature of the optical sensor 40. In FIG. 3, sensor 40 receives incoming light and converts that light into an electrical signal 400. The electrical signal is conditioned by the signal conditioner 41 and is supplied as conditioned signal 410 to a logical comparator 42. Comparator 42 compares the conditioned signal 410 from the signal conditioner 41 with a threshold value supplied on line 411. The threshold value is chosen as a value which the output from signal conditioner 410 exceeds when the light received in sensor 40 is ambient light. The threshold value may be different depending upon the working environment of the hand held scanning terminal. Thus, in one embodiment of the instant invention, the threshold value may be changed by operation of the function keys 31 in accordance with the soft menu 21.

The output 420 of comparator 42 will be a logical value having a value of "1" when the lid is open and a value of "0" when the lid is closed. Thus, the output of comparator 42 may be considered a position signal. The logical value 420 is supplied to an AND gate 43. AND gate 43 is also supplied with a lid switch disable/enable signal along line 421 which has a logical "1" when, under function key 31 selection, it is desired to have the hand held scanning terminal 10 cease scanning when the top portion 62 is in the open position. The signal along line 421 has a logical "0" when it is desired that the scanner operate regardless of the open/closed state of the top portion 62. The output 430 from AND gate 43 is supplied to control the scanning engine in an on/off manner. When the output 430 has a logical "0" the device will operate in the scanning mode. On the other hand, when the output 430 has a logical "1" the scanning beam will be disabled. Elements 41, 42 and 43 form a logic circuit 44.

The device may alternatively be employed in an auto-scan hand held scanning terminal which begins scanning immediately upon the detection of a bar code label 80. Such auto scan bar code readers are described in the above incorporated patents. When the instant invention is employed in such a device, the circuit described in conjunction with FIG. 3 operates to enable and disable the auto scan function.

The sensor 40 may also be used for other functions under the control of function keys 31 and soft menu selections 21. For example, sensor 40 may be used to detect an amount of ambient light. In this fashion the device will use the amount of ambient light to adjust an operating state of the hand held scanning terminal. For example, the intensity and/or contrast of the LCD display could be automatically adjusted for optimal viewing under particular lighting conditions. The sensed ambient light may also be used to adjust the intensity of the scanning beam.

In the above applications, the LCD display and/or scanning beam intensities may be automatically adjusted using a circuit similar to that shown in FIG. 3. Referring to FIG. 3, the output 420 from comparator 42 is used to select between two different intensities. The threshold value along line 411 is chosen as a value wherein, when the ambient light is above the threshold value, a first intensity is used, and when the ambient light detected by sensor 40 is below the threshold value a second intensity is used. As is evident, multiple scanning or LCD display intensities could be accommodated with slight modifications to the circuitry. Further, the logic functions and circuitry could also be accomplished in software using the MPU in the scanning engine.

Figure 4:
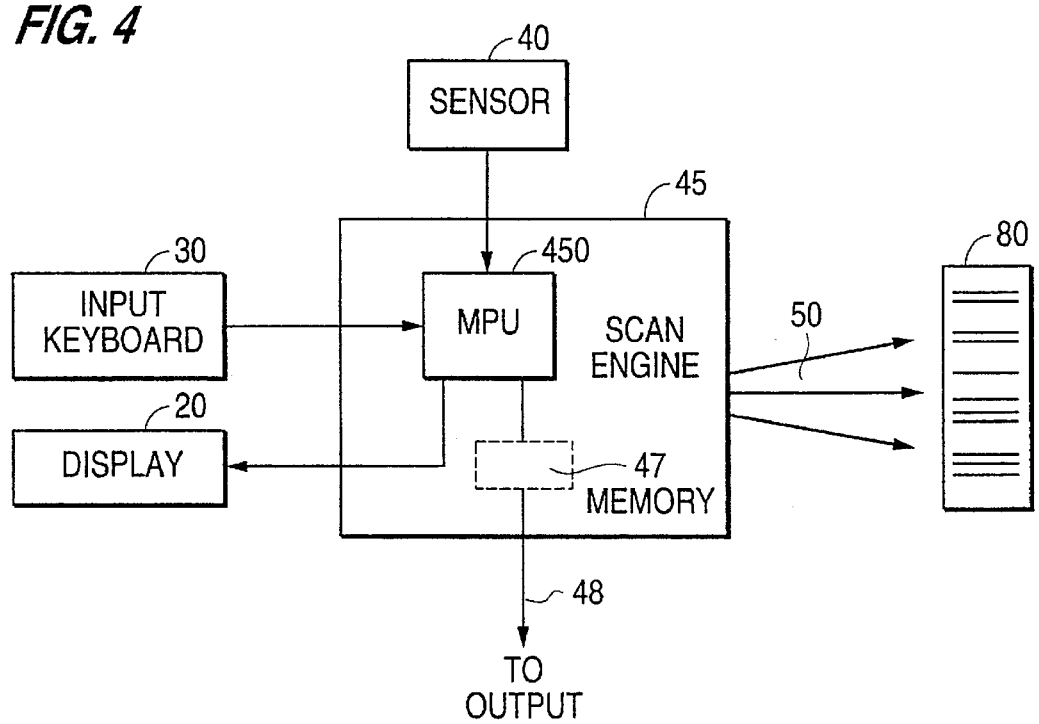
FIG. 4 shows a block diagram of the major electronic components of an embodiment of the invention.

FIG. 4 is a block diagram illustrating the major electrical components of an embodiment according to the instant invention. A scan engine 45 transmits the scanning beam 50 and receives light reflected from a bar code or other optical indicia 80. Light reflected from the optical indicia 80 is detected by the scan engine 45 and provided to an internal microprocessor unit (MPU) 450 which decodes the data. The decoded data may be immediately transmitted to other data processing circuitry or it may be stored in an optional memory unit 47. The data may be directly readout or subsequently readout of memory 47 through data port 48.

In the event a particular bar code or optical indicia 80 is not readable, data may be entered manually through the keyboard 30 and provided to the MPU 450. The data may the be used in the same manner as scanned data. Display 20 is driven under the control of MPU 450 and is responsive to actuation of the keyboard 30 and/or operation of the scan engine 45 to display the entered (or detected) data. Keyboard 30 may also be used to control various scanning functions such as scan angle, scanning rate, laser intensity, decoding symbology, etc.

In the shown embodiment, the output from sensor 40 is supplied to the MPU 450. Under software control, the sensed light is used by the scan engine 45 to disable or not disable scanning or to perform other light sensitive functions as described above.

Figure 5:
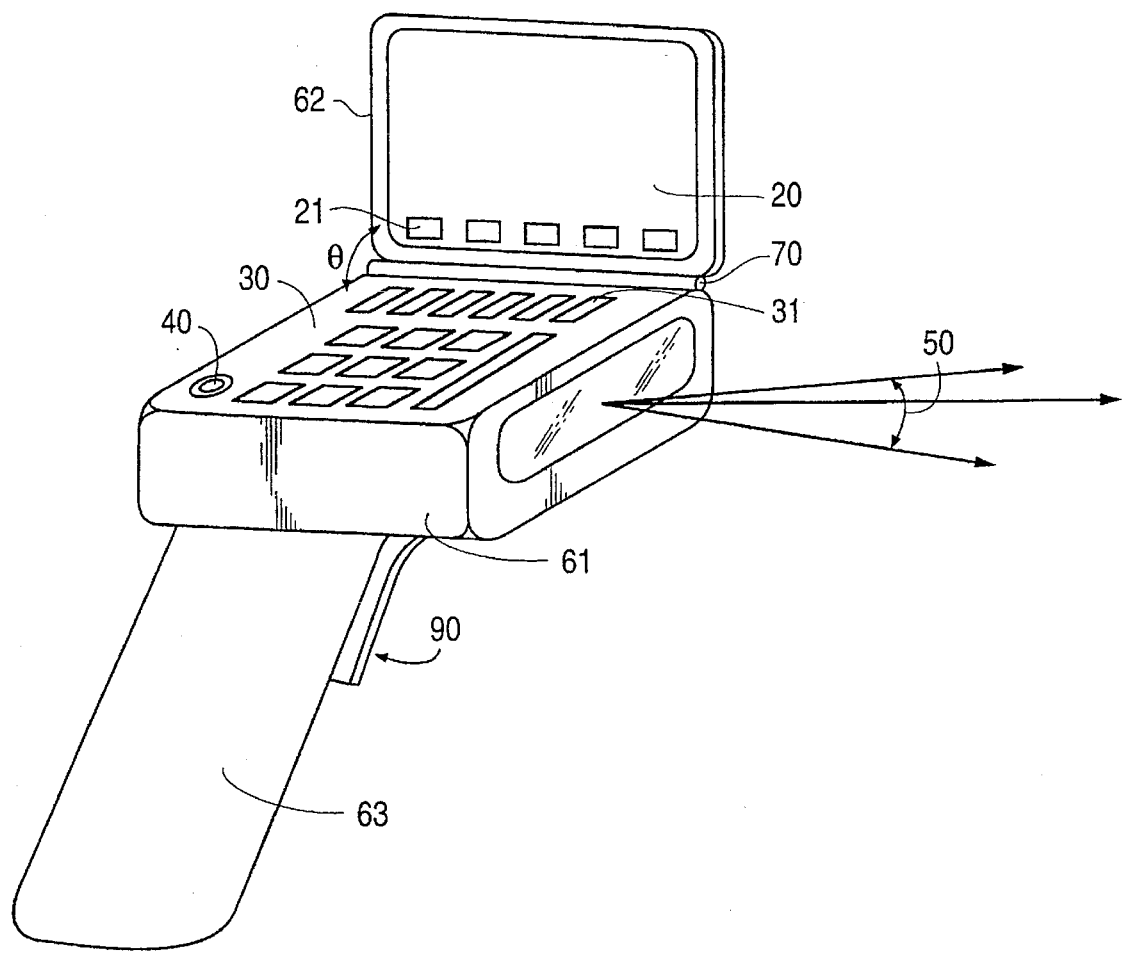
FIG. 5 illustrates a hand held scanning terminal according to another embodiment of the instant invention.

Referring to FIG. 5 another embodiment of the invention is depicted. Like elements are designated with similar reference numerals. In FIG. 5, a gun-type hand held scanning terminal 100 is generally shown. The hand held scanning terminal 100 has a top portion 62 which opens and closes on hinge 70 which is attached to a bottom portion 61. These elements are substantially similar to the embodiment described in connection with FIG. 2A. A handle 63 extends downwardly from the bottom portion 61. The handle 63 includes a trigger 90 as described in, for example, U.S. Pat. No. 4,593,186 issued to Swartz et al. on Jun. 3, 1986 entitled "Portable laser scanning system and scanning methods." The trigger 90 is used to actuate the scanning beam 50. The sensor 40 may be used in a manner similar to that described in FIG. 3 to disable the scanning operation even when trigger 90 is depressed when the top portion 62 is in an open position. This will permit easy and safe handling of the hand held scanning terminal 100 when using the data input keyboard 30 and function keys 31 to manipulate the soft menu 21 and other information displayed on the display 20. This is particularly important since accidental ocular exposure to the laser scanning beam 50 should be avoided. When needed this safety device could be deactivated so that the device be used with the display 20 in its open position in order to display data to the operator during use. The enable/disable function of the scanning operation may be performed using the soft menu 21 and function keys 31 in a manner similar to that disclosed in FIG. 3.

Figure 6:
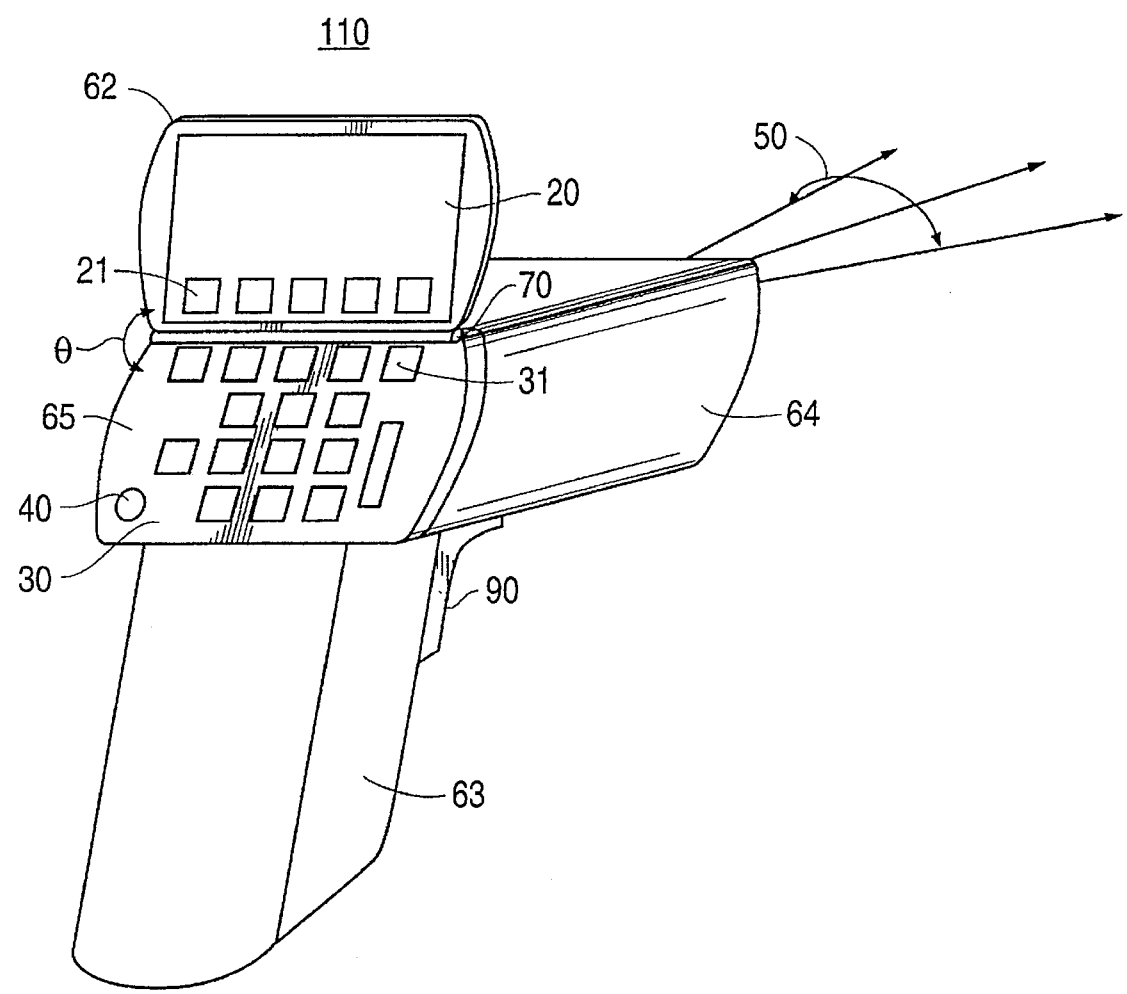
FIG. 6 illustrates a hand held scanning terminal according to still another embodiment of the instant invention.

FIG. 6 illustrates still another embodiment of the instant invention. The hand held scanning terminal shown in FIG. 6 is a hand held scanning terminal similar to that shown in FIG. 5. Similar elements are indicated by like numerals. The hand held scanning terminal of FIG. 6 includes a scanning engine portion 64 which has a back portion 65 and a handle 63 extending beneath the scanning engine portion 64. The back portion 65 includes the data input keyboard 30, the function keys 31 and the sensor 40. The upper portion 62 is attached to the back portion 65 via hinge 70. The operation of the device is similar to the operation of the hand held scanning terminals depicted in FIGS. 2A and 4.

Figure 7:
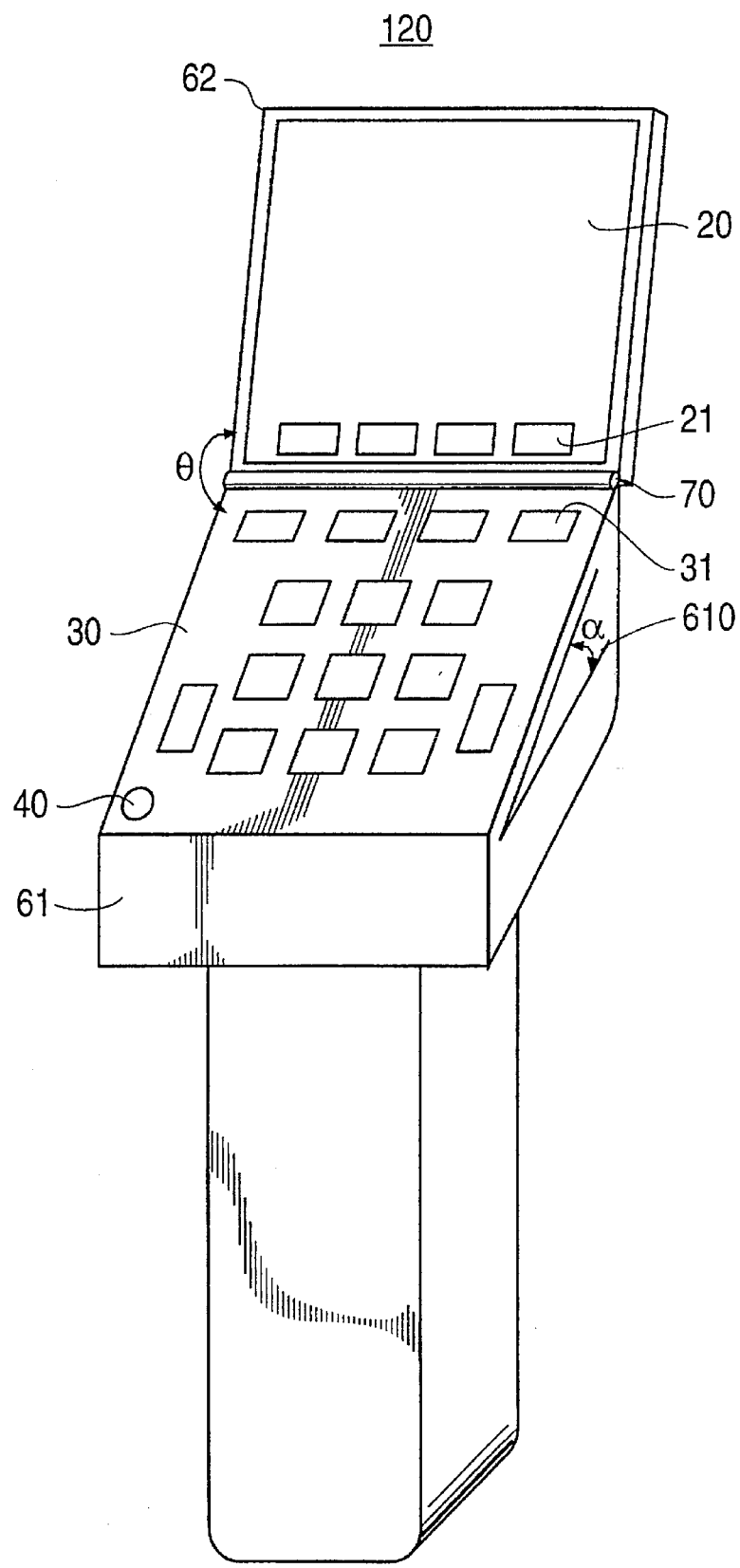
FIG. 7 illustrates a hand held scanning terminal according to another embodiment of the instant invention.

Still another combination hand held scanning terminal 120 is depicted in FIG. 7. In FIG. 7, top portion 62 including display 20 is mounted in hinge 70 along the front (scan beam side) of bottom portion 61. This allows the operator to more easily view the display 20 when it is used during scanning. As further illustrated in FIG. 7, the top surface of bottom portion 61 having keyboard 30 thereon is sloped upwardly from the back to the front by an angle α as shown at numeral 610. This provides ease of use and viewing of the data input keyboard 30. As is evident, such a feature could be incorporated in other embodiments according to the desired use of the hand held scanning terminal.

Figure 8:
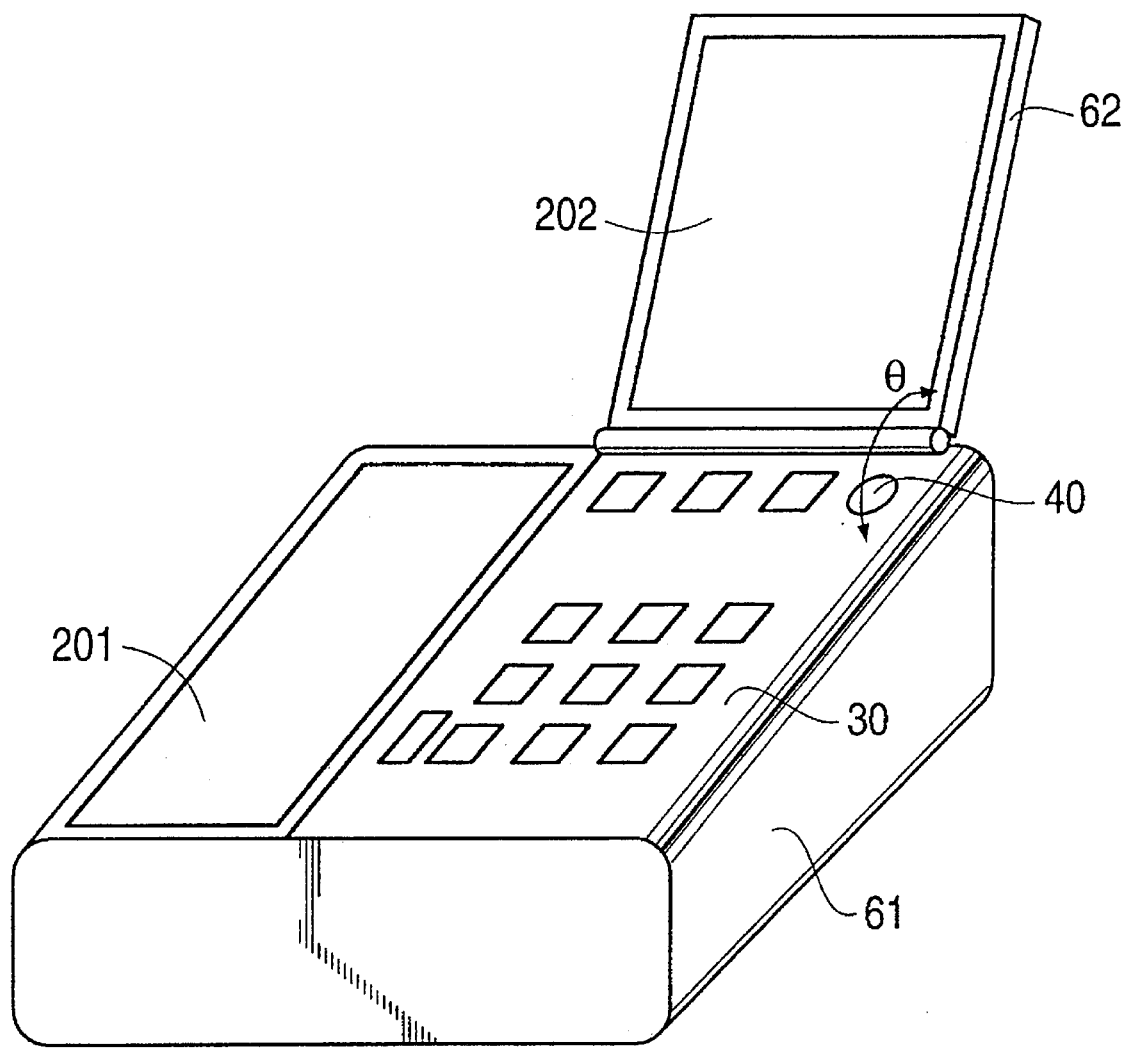
FIG. 8 illustrates a hand held scanning terminal according to still another embodiment of the instant invention.

According to the instant invention, the top potion need not completely cover the top of the scanning unit. As shown in FIG. 8, the top portion 62 covers only a portion of the device. The top portion 62 could be used solely as a cover to protect the keyboard 30. A display 201, incorporated next to the input keyboard on the top surface of bottom portion 61, could be used to display certain items of information at all times to the user. The top portion 62 may also include a display 202 for displaying additional data. For example the display 201 may display operating conditions and scanned data. Display 202, on the other hand, could be used to display information related to manual operation of keyboard 30. In this manner the most efficient use of the small space on the scanning device can be accomplished according to the desired use. The device depicted in FIG. 8 could be used in either a back of the hand scanning terminal or a gun-type hand held scanning terminal.

From the foregoing description, it will be apparent that there has been provided an improved portable hand held scanning terminal which enables scanning operations to be performed in a convenient and safe manner and having great flexibility. Variations and modifications in the described hand held scanning terminal, within the scope of the invention, will undoubtedly suggest themselves to those skilled in the art.

For example, the hinge for the display may be located on different sides of the device depending upon the desired viewing angle and use of the device. The disclosed feature may be combined in any number of permutations without deviating from the scope of the invention.

The light sensor could alternatively be located on the top portion 62 rather than on the bottom portion 61. While the disclosed embodiments use an optical switch to determine when the lid is open, in another embodiment, a mechanical switch could be used to provide this function.

Accordingly, the foregoing descriptions should be taken as illustrative and does not limit the invention. The invention is defined by the appended claims attached hereto.

What is claimed is:

1. A scanning device for reading a data pattern, comprising:

a base including a scan beam side allowing light to pass therethrough;

a scanning engine disposed within said base unit, said scanning engine projecting a scanning light beam through said scan beam side of said base toward said data pattern, detecting a plurality of intensities of light reflected by said pattern and identifying said pattern on a basis of said plurality of intensities of light;

a cover movably connected to said base, said cover having an open position and a closed position, said cover covering a portion of said base when said cover is in said closed position;

input keys located on said portion of said base and covered by said cover when said cover is in said closed position;

a light sensor located on one of said portion of said base, and a side of said cover facing said portion of said base when said cover is in said closed position, said input keys and said light sensor being substantially covered by said cover when said cover is in said closed position, said light sensor outputting a position signal indicating whether said cover is in said open position or said closed position; and a circuit responsive to said position signal to control an on/off state of said scanning engine.

2. A scanning device as recited in claim 1, further comprising a display incorporated into one of said cover and said portion of said base.

3. A scanning device as recited in claim 2, wherein said input keys include function keys and said display includes soft menu functions corresponding to said function keys.

4. A scanning device as recited in claim 2, wherein said display is incorporated into the side of said cover adjacent said portion of said base when said cover is in said closed position, said display defining a plane at one or more predetermined angles to said base when said cover is in said open position.

5. A scanning device as recited in claim 4, wherein said predetermined angles is in a range of 70°–110°.

6. A scanning device as recited in claim 2, further comprising:

a handle, extending downwardly from a bottom of said base; and a scanning device actuator positioned on said handle.

7. A scanning device as recited in claim 6, wherein said display defines a plane extending upward from said base in a direction opposite to said handle when said cover is in said open position.

8. A scanning device as recited in claim 1, wherein said position signal operates to disable said scanning engine when said cover is in said open position.

9. A scanning device as recited in claim 8, wherein said operation of said position signal to disable said scanning engine is selectively controlled by operation of said input keys.

10. A scanning device as recited in claim 1, wherein said base includes a bottom, and said device further includes a holding means for attaching said bottom of said base to a back of a hand of an operator of said scanning device, and wherein said scan beam side is positioned relative to said holding means so as to project said scanning beam in a plane substantially parallel to said back of said hand and in a direction away from said operator.

11. A scanning device for reading a pattern of different light reflectivity, comprising:

a housing comprising a first portion and a second portion, said first portion being connected to said second portion via a pivotal mount defining an open position and a closed position for said housing;

a scanning engine disclosed within said second portion;

a display formed on a face of said first portion;

an input device formed on a surface of said second portion; and a light sensing circuit including a sensor located on said surface of said second portion, wherein said display and said input device face each other in close proximity when said housing is in said closed position, said display and said surface of said second portion forming a predetermined angle therebetween when said housing is in said open position, said sensor being substantially shielded from light when said housing is in said closed position.

12. A scanning device as recited in claim 11, wherein said light sensing circuit generates a signal to said scanning engine indicating whether said display is in said open position or said closed position.

13. A scanning device as recited in claim 11, wherein said sensors detects an amount of ambient light when said housing is in said open position and said light sensing circuit automatically adjusts an intensity of said display according to said ambient light.

14. A scanning device as recited in claim 11, wherein said sensors detects an amount of ambient light when said housing is in said open position and said light sensing circuit automatically adjusts an intensity of said scanning beam according to said ambient light.

15. A scanning device as recited in claim 11, wherein said display has a plurality of open positions, each of said open positions corresponding to one of a plurality of predetermined angles.

* * * * *